A. M. LIVELSBERGER.
TIRE CUSHION.
APPLICATION FILED MAY 19, 1915.
1,166,065. Patented Dec. 28, 1915.
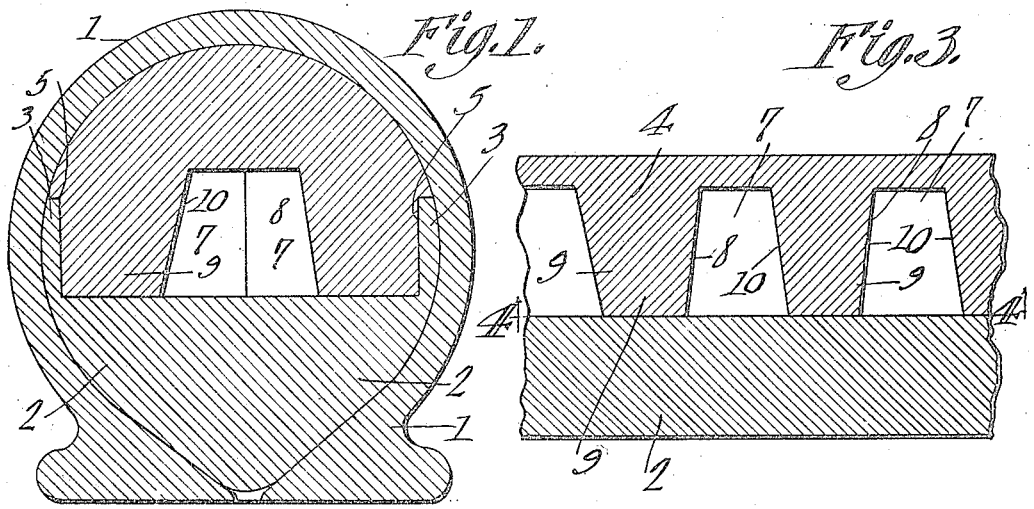
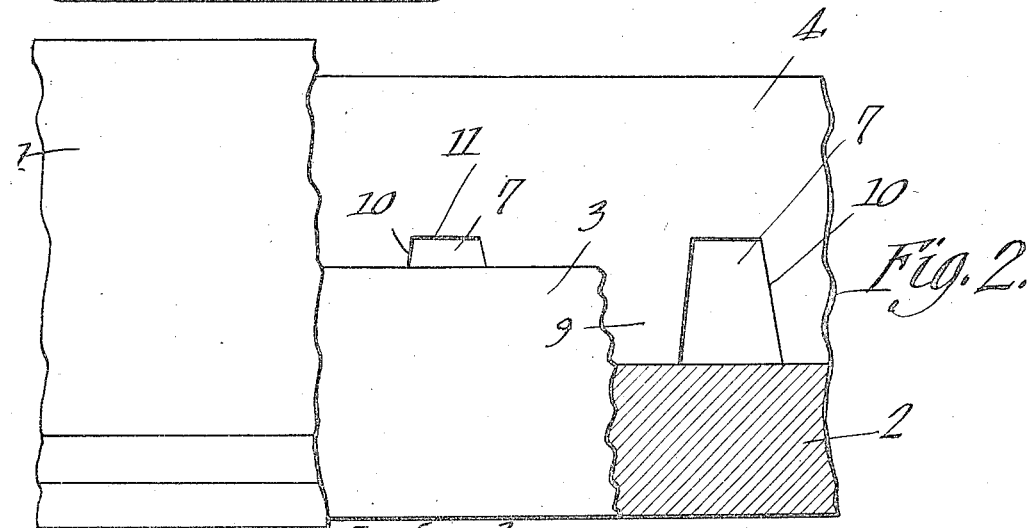
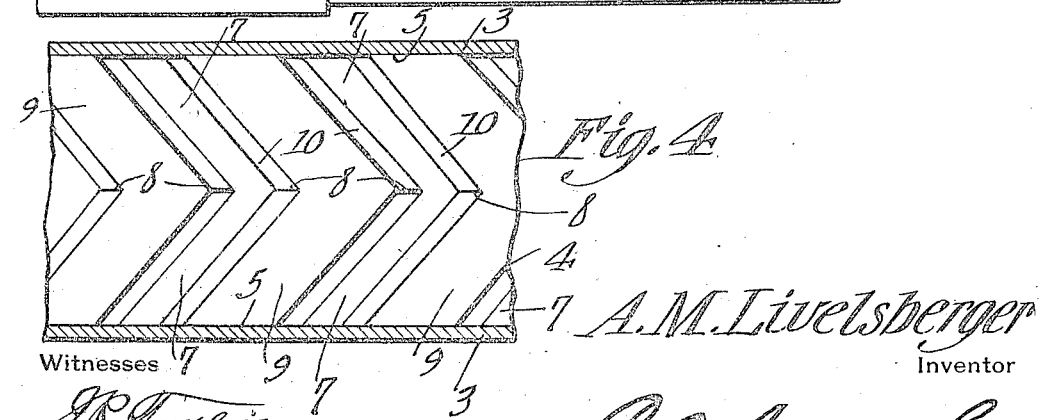
A. M. Livelsberger, Inventor

UNITED STATES PATENT OFFICE.

ALBERT M. LIVELSBERGER, OF KALAMAZOO, MICHIGAN, ASSIGNOR OF ONE-HALF TO ALVIN BAIR, OF TIFFIN, OHIO.

TIRE-CUSHION.

1,166,065.

Specification of Letters Patent.

Patented Dec. 28, 1915.

Application filed May 19, 1915. Serial No. 29,157.

*To all whom it may concern:*

Be it known that I, ALBERT M. LIVELSBERGER, a citizen of the United States, residing at the city of Kalamazoo, in the county of Kalamazoo and State of Michigan, have invented a new and useful Tire-Cushion, of which the following is a specification.

The device forming the subject matter of this application is a cushion adapted to replace a pneumatic inner tube or a spring structure which is the mechanical equivalent thereof.

The invention aims to provide a circumferentially extended tread strip and a circumferentially extended base, the tread strip being provided with slots formed in a novel manner to afford the desired resiliency, without rendering the tire unduly yielding, novel means being provided for preventing relative transverse movement between the base and the tread strip and for preventing the tread strip from injuring the casing wherein the base and the tread strip are inclosed.

It is within the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows the invention in transverse section, mounted within an inclosing casing; Fig. 2 is a side elevation, wherein parts are successively broken away and sectioned; Fig. 3 is a fragmental longitudinal section taken in a vertical plane at one side of the median plane, the casing being omitted; Fig. 4 is a fragmental section on the line 4—4 of Fig. 3 looking upwardly in the direction of the arrows.

In carrying out the present invention there is provided a casing 1 which may be of any desired form and be made of any selected substance, a detail description of the casing being unnecessary since many casings now on the market may be employed with advantage.

The invention comprises a base strip 2 fitting closely within the casing 1 and provided along its longitudinal edges with projecting flanges 3. The base 2 preferably is resilient and may be made of rubber or a rubber composition, or any other material.

The invention comprises a tread strip 4 which ordinarily is made of rubber, the strip 4 resting on the base 2 and being provided with recesses 5 in its sides, which recesses receive the flanges 3. The tread strip 4 like the base strip 2 extends circumferentially of the wheel, preferably although not necessarily in a continuous length, the parts 4 and 2 coacting to fill substantially the interior of the casing 1 as will be understood clearly from Fig. 1. In that face of the tread strip 4 which is adjacent the base strip 2, transverse slots are formed. These slots consist each of converging branches 7 defining apices 8 located adjacent the median plane of the cushion. Between the slots 7 ribs 9 are formed, the ribs resting on the base 2. The forward and rear walls of the transverse slots in the tread 4 converge as they extend outwardly toward the periphery of the tread strip, as indicated at 10. As shown at 11, the transverse slots in the tread strip 4 project outwardly toward the circumference of the tread strip, beyond the edges of the flanges 3 on the base strip 2.

Noting particularly Fig. 4 it will be observed that owing to the V or arrow shape of the ribs 9, the weight will be disposed on one rib at its end, before the weight is entirely off the next adjoining rib adjacent the apex 8 of the said rib.

The flanges 3 not only serve to prevent relative transverse movement between the tread strip 4 and the base strip 2 but also prevent the casing 1 from being injured due to a lateral movement of the tread strip 4.

Having thus described the invention, what is claimed is:—

In a device of the class described, a casing; a circumferentially extended base in the casing; and a circumferentially extended tread strip in the casing and coacting with the base; that face of the tread strip which is adjacent the base being provided with transverse slots comprising diverging branches extended through the sides of the strip to define approximately radial edges in the strip; and the base being provided with flanges which overlap the outer faces of the strip and serve to prevent contact between portions of the radial edges of the strip and the circumferential edges of the strip on the one hand and the casing on the other hand.

In testimony that I claim the foregoing as my own, I have hereto affixed my signature in the presence of two witnesses.

ALBERT M. LIVELSBERGER.

Witnesses:
   LINCOLN H. TITUS,
   VERNA P. CAMPBELL.